(12) United States Patent
Hagiuda

(10) Patent No.: US 9,723,024 B2
(45) Date of Patent: Aug. 1, 2017

(54) MANAGEMENT APPARATUS, CONTROL METHOD THEREOF, AND STORAGE MEDIUM

(71) Applicant: CANON KABUSHIKI KAISHA, Tokyo (JP)

(72) Inventor: Tadashi Hagiuda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 265 days.

(21) Appl. No.: 14/316,863

(22) Filed: Jun. 27, 2014

(65) Prior Publication Data

US 2015/0020150 A1    Jan. 15, 2015

(30) Foreign Application Priority Data

Jul. 9, 2013   (JP) ................................ 2013-143872

(51) Int. Cl.
| | | |
|---|---|---|
| H04L 29/06 | (2006.01) | |
| G06F 15/177 | (2006.01) | |
| H04L 12/24 | (2006.01) | |
| H04N 1/44 | (2006.01) | |

(52) U.S. Cl.
CPC .......... *H04L 63/20* (2013.01); *H04L 41/0853* (2013.01); *H04L 41/0866* (2013.01); *H04N 1/4406* (2013.01); *H04L 41/085* (2013.01); *H04L 41/0856* (2013.01)

(58) Field of Classification Search
CPC ........ H04L 63/20; H04L 41/0866; H04N 1/44
See application file for complete search history.

(56) References Cited

U.S. PATENT DOCUMENTS

| | | | | |
|---|---|---|---|---|
| 8,131,992 B2 * | 3/2012 | Ennis, Jr. | ............ | H04L 41/0853 370/254 |
| 8,412,925 B2 * | 4/2013 | Ennis, Jr. | ............ | H04L 41/0853 370/254 |
| 8,595,476 B2 * | 11/2013 | Ennis, Jr. | ............ | H04L 41/0853 370/254 |

(Continued)

FOREIGN PATENT DOCUMENTS

JP          2002-247033 A          8/2002

*Primary Examiner* — Linglan Edwards
(74) *Attorney, Agent, or Firm* — Carter, DeLuca, Farrell & Schmidt, LLP

(57) ABSTRACT

A management server is provided that manages a plurality of image forming apparatuses including an image forming apparatus compliant with a setting management function that enables an operation of security information, and an image forming apparatus non-compliant with the setting management function. The management server receives security information from the image forming apparatus, and determines whether the security information includes a change. When the image forming apparatus that is a transmission source of the security information including the change is non-compliant with the setting management function, the management server outputs a notice indicating that the security information including the change as a notice, whereas when the image forming apparatus is compliant with the setting management function, the management server outputs a notice indicating that the security information including the change as a warning.

9 Claims, 11 Drawing Sheets

(56) References Cited

U.S. PATENT DOCUMENTS

| | | | | |
|---|---|---|---|---|
| 8,856,292 | B2* | 10/2014 | Srinivasan | H04L 41/0866 709/221 |
| 8,869,272 | B2* | 10/2014 | Kumar | G06F 21/554 726/22 |
| 9,088,541 | B2* | 7/2015 | Rieke | H04L 63/02 |
| 9,367,705 | B2* | 6/2016 | Ryerson | G06F 21/6245 |
| 2004/0139193 | A1* | 7/2004 | Refai | H04L 41/0803 709/224 |
| 2009/0303518 | A1* | 12/2009 | Sekiya | G06F 21/608 358/1.15 |
| 2011/0004914 | A1* | 1/2011 | Ennis, Jr. | H04L 41/0853 726/1 |
| 2014/0136629 | A1* | 5/2014 | Nguyen | H04L 51/24 709/206 |

* cited by examiner

FIG. 9A

| Device identifier | Device name | IP address | Presence/absence of a policy setting function | User name | Password | Initial search date and time |
|---|---|---|---|---|---|---|
| 1 | Device120 | 192.168.xx.xx | True | admin001 | ******* | 2013/01/23 13:00:00 |
| 2 | Device130 | 192.168.yy.yy | False | user012 | ******* | 2013/01/23 13:00:01 |
| 3 | Device140 | 192.168.zz.zz | True | admin002 | ******* | 2013/01/23 13:00:02 |

| Condition identifier | Start date and time | Execution schedule | | | | | | |
|---|---|---|---|---|---|---|---|---|
| | | Mon | Tue | Wed | Thu | Fri | Sat | Sun |
| 1 | 2013/02/03 10:07:43 | 08:30:00 17:00:00 | 08:30:00 17:00:00 | 08:30:00 17:00:00 | 08:30:00 17:00:00 | 08:30:00 17:00:00 | – | – |
| 2 | 2013/04/20 15:32:19 | 09:00:00 16:00:00 | 09:00:00 16:00:00 | 09:00:00 16:00:00 | 09:00:00 16:00:00 | 09:00:00 16:00:00 | 09:00:00 16:00:00 | 09:00:00 16:00:00 |

| Condition identifier | Security information monitoring | State monitoring | Notice destination mail address | Registered date and time |
|---|---|---|---|---|
| 1 | True | True | aaa.bbb@xxxx.jp | 2013/02/02 11:32:45 |
| 2 | True | False | ccc.ddd@xxxx.jp | 2013/02/04 13:23:19 |

| Device identifier | Port open setting | Firewall required | Initial password forced change | Password complexity request | Guest account prohibition | ... | Final update date and time |
|---|---|---|---|---|---|---|---|
| 1 | 80, 443, 8080 | False | False | False | False | ... | 2013/02/28 15:13:12 |
| 2 | 80 | False | False | False | False | ... | 2013/02/20 10:09:52 |
| 3 | 80, 443 | True | True | True | True | ... | 2013/03/04 16:21:02 |

| Policy manager | | General user 1 | | General user 2 | | General user 3 | | ... |
|---|---|---|---|---|---|---|---|---|
| User name | Password | User name | Password | User name | Password | User name | Password | ... |
| admin001 | ******** | user001 | ******** | user002 | ******** | user003 | ******** | ... |

| Port open setting | Firewall required | Initial password forced change | Password complexity request | Guest account prohibition | ... | Final update date and time |
|---|---|---|---|---|---|---|
| 80, 443, 8080 | False | False | False | False | ... | 2013/02/28 15:13:12 |

| Paper feeding method | Job interruption time-out | Color automatic selection in copying | Report output by printer | Alarm volume | ... | Final update date and time |
|---|---|---|---|---|---|---|
| Speed priority | 10 minutes | False | Status print | 8 | ... | 2013/03/01 09:56:21 |

| General user 1 | | General user 2 | | General user 3 | | ... |
|---|---|---|---|---|---|---|
| User name | Password | User name | Password | User name | Password | ... |
| user010 | ******** | user011 | ******** | user012 | ******** | ... |

| Port open setting | Paper feeding method | Job interruption time-out | Firewall required | Color automatic selection in copying | Report output by printer | ... | Final update date and time |
|---|---|---|---|---|---|---|---|
| 80, 443, 8080 | Speed priority | 10 minutes | False | False | Status print | ... | 2013/02/28 15:13:12 |

1012

MANAGEMENT APPARATUS, CONTROL METHOD THEREOF, AND STORAGE MEDIUM

BACKGROUND OF THE INVENTION

Field of the Invention

The present invention relates to a monitoring technique for a security policy included in setting information for a network device connected to a network.

Description of the Related Art

There has been proposed a system in which a network device is connected to a network inside an office. The network device is, for example, a PC (Personal Computer), a server apparatus, an image forming apparatus, and the like.

Recently, a certain network device has the same function as other server apparatuses existing on the network, and such a device not only simply prints or transmits an image, but also stores image data and provides a file service function.

In light of this background, there has been developed a network device that can set information regarding security (hereinafter called "security information"), such as a setting that necessarily requires user authentication, or encryption of a communication pathway.

In addition, there has been developed a network device having a function that follows the security policy (hereinafter called "policy setting function") similar to a PC (Personal Computer) or a server apparatus. The security policy of the network device is a basic policy related to information security for the network device, and is defined, for example, for preventing a usage of information by an unauthorized user or an information leak.

Also, the policy setting function of the network device means a function that integrally manages a plurality of settings included in the security policy. The settings included in the security policy include, for example, a user authentication/password setting, a setting related to encryption of a communication pathway, a setting related to job execution, a setting related to a security log, and the like.

By importing a pre-generated definition file for the security policy into the network device having the policy setting function, change in the security policy from outside is enabled. Also, by exporting the definition file from the network device, output of security information for the device itself is enabled.

For the security policy, it is required for managing the security policy to maintain its settings in an appropriate state. For this purpose, there has been proposed a system in which a server manages the settings included in the security policy of the network device. Japanese Patent Laid-Open No. 2002-247033 discloses a security management system that periodically monitors the security policies of the variety of apparatuses, and corrects settings of the security policy if settings that conflict with the security policy in an organization are detected.

In the network device having the policy setting function, the settings included in the security policy can be changed by a specific authentication account of a policy manager, but cannot be changed by a user account of a general user. Thus, a server can integrally manage such settings included in the security policy with respect to the network device having the policy setting function in accordance with the intentions of the policy manager.

On the other hand, in the network device not having the policy setting function, the setting related to user authentication, or the setting related to encryption of the communication pathway can be enabled by using the user account of the general user. Hence, it is assumed that a setting change that the policy manager does not intend may be made to the network device not having the policy setting function. As a result, the server cannot effectively manage the security policy of the network device under an environment where the network device having the policy setting function and the network device not having the policy setting function are mixed.

SUMMARY OF THE INVENTION

A management apparatus according to one aspect of the present invention manages a plurality of image forming apparatus including an image forming apparatus compliant with a setting management function that enables an operation of a plurality of setting values sorted into a prescribed policy included in setting information for the image forming apparatus by a specific authority, and an image forming apparatus non-compliant with the setting management function. The management apparatus includes a receiving unit configured to receive the respective setting information from the plurality of the image forming apparatuses; a first determining unit configured to determine whether the plurality of setting values sorted into the prescribed policy included in the received setting information include a change; a second determining unit configured to determine whether the image forming apparatus that is a transmission source of the setting values of which the first determining unit determines that the setting values include the change is the image forming apparatus compliant with the setting management function; and an outputting unit configured to output a notice indicating that the setting values have been changed as a warning if the second determining unit determines that the image forming apparatus that is the transmission source is non-compliant with the setting management function. The outputting unit outputs a notice indicating that the setting values have been changed as a notice if the second determining unit determines that the image forming apparatus that is the transmission source is compliant with the setting management function apparatus.

According to the management apparatus of the present invention, the server can effectively manage the security policy of the network device under an environment where the network device having a policy setting function and the network device not having a policy setting function are mixed.

Further features of the present invention will become apparent from the following description of exemplary embodiments (with reference to the attached drawings).

FIGS. 9A to 9D illustrate examples of various tables that are stored in a database unit.

FIGS. 10A to 10E illustrate examples of various tables in which information held by a network device is stored.

Figures 11A, 11B:
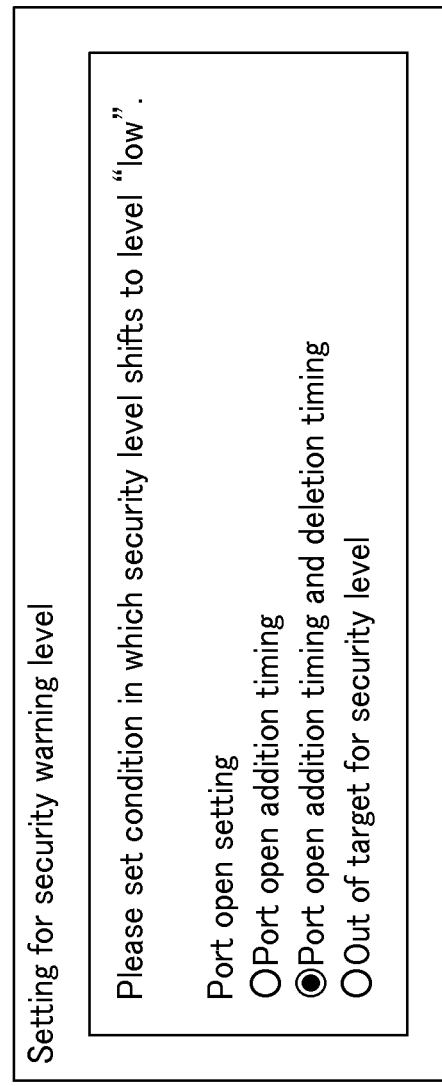

FIGS. 11A and 11B respectively illustrate an example of a security level determination table or a security level determination condition setting screen.

DESCRIPTION OF THE EMBODIMENTS

Below, a description will be given of an embodiment of the present embodiment with reference to the drawings. In the present embodiment, a network device to be managed by a device management system is an image forming apparatus such as a copying machine, a printer, a scanner, or the like. Naturally, the device management system may manage arbitrary apparatuses that can connect to a network such as a mobile terminal such as a mobile phone, a car navigation system, audio home electronics, or the like. The management apparatus of the present embodiment also manages a plurality of image forming apparatuses including an image forming apparatus compliant with a setting management function and an image forming apparatus non-compliant with the setting management function. The setting management function is a function that allows an operation, by means of a specific authority, of a plurality of setting values sorted in a prescribed policy that is included in setting information of the image forming apparatus. The setting management function is hereinafter described as a "policy setting function". In the present embodiment, the prescribed policy is a security policy. Also, the values sorted in the security policy are hereinafter described as "security information".

The security information includes at least any one of the following plural parameters (setting values). Specifically, such security information includes at least a network-related setting, a user authentication/password setting, a job-related setting, a secret code/encryption key-related setting, a security log-related setting, a storage unit-related setting, and an extended application-related setting. The job-related setting is a setting related to job execution for printing, facsimile, or the like.

The network-related setting includes, for example, a subscription function of a file server, a setting related to authentication prohibition by plain text, an open setting for a port, a setting related to the prohibition of SNMPv1, a setting as to whether the firewall is required, and a setting as to whether a SNTP setting is required. SNMP is an abbreviation for "Simple Network Management Protocol".

Also, the user authentication/password setting includes, for example, a setting related to guest account prohibition, a setting related to a lockout specification, a login deadline, and a setting related to cash prohibition of a password. The user authentication/password setting also includes, for example, maximum valid days of a password, a setting as to whether a password is forcibly changed, and a setting related to a complexity required for a password.

The job-related setting includes, for example, a setting as to whether user authentication is enforced when a job is printed, a setting in which data transmission is allowed only to a defined address destination, a setting in which two inputs of a FAX address are enforced, and a setting in which FAX transfer is prohibited.

The secret code/encryption key-related setting includes a setting as to whether to respond to a vulnerable code, and a setting for consolidating a user key to be saved. The security log-related setting includes, for example, a setting related to acquisition of an access log. The storage unit-related setting includes, for example, a setting related to enforcing overwriting deletion. The extended application-related setting includes, for example, a setting as to whether an application unadaptable to the policy is permitted.

For a network device compliant with the policy setting function, a portion or all of the aforementioned security information can be operated and managed by means of a specific authentication account (hereinafter called a "policy manager account"). On the other hand, for a network device that is non-compliant with the policy setting function, security information can be individually operated along with the setting values other than security information by means of a manager account or general user account. Here, the setting values operable with even the general user account are hereinafter described as "user mode settings".

Note that an applicable scope of the present embodiment is not limited to the monitoring of security information of the network device. The present invention can be applied when security information of various network devices including a general computer is managed.

First Embodiment

Figure 1:
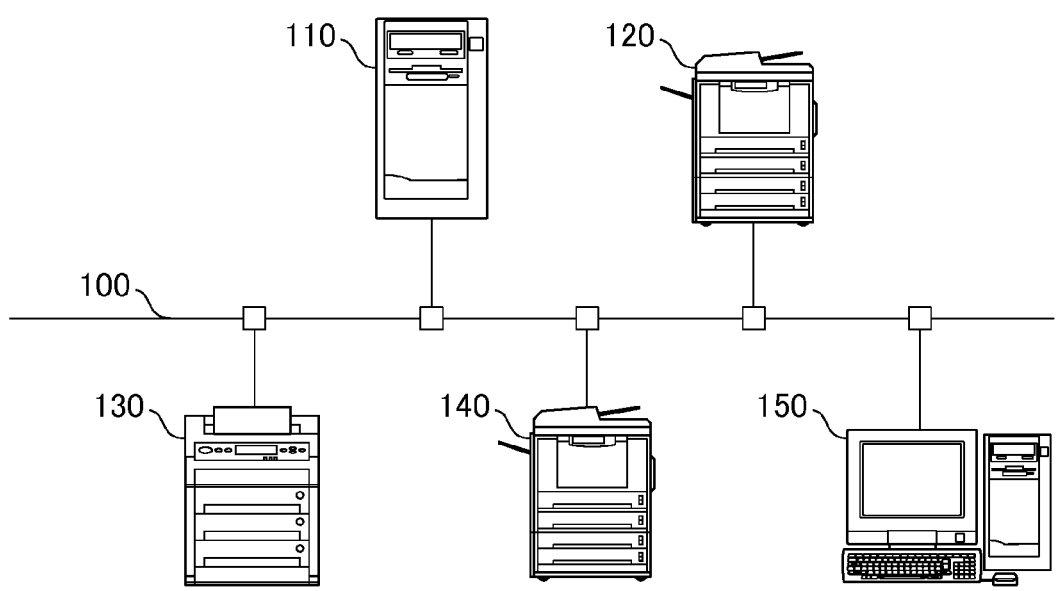
FIG. 1 illustrates an example of a configuration of a device management system according to the present embodiment.

FIG. 1 is a diagram illustrating a configuration example of a device management system according to the present embodiment. The device management system shown in FIG. 1 includes a management apparatus 110, a client PC 150, and a plurality of network devices 120, 130 and 140. The management apparatus 110, the client PC 150, and the network devices 120, 130 and 140 can communicate with each other via a local area network 100.

The management apparatus 110 is a server that manages security information for a multi peripheral device by using a device management program that operates on a WWW server. The network devices 120 and 140 are devices compliant with a policy setting function. For example, in the network devices 120 and 140, security information thereof can be collectively set through authentication processing of a policy manager account.

The network device 130 is a device that is non-compliant with the policy setting function. Thus, in the network device 130, security information thereof can be externally changed but cannot be collectively set since the security information is mixed with other parameters.

Also, in the network device 130, the authentication processing of the policy manager account is not required when security information is changed, and the security information can be changed using a general user account. Thus, the network device 130 has a potential to become a security hole in the network. In this example, assume that the network devices 120 and 140 are image forming apparatuses.

Figure 2:
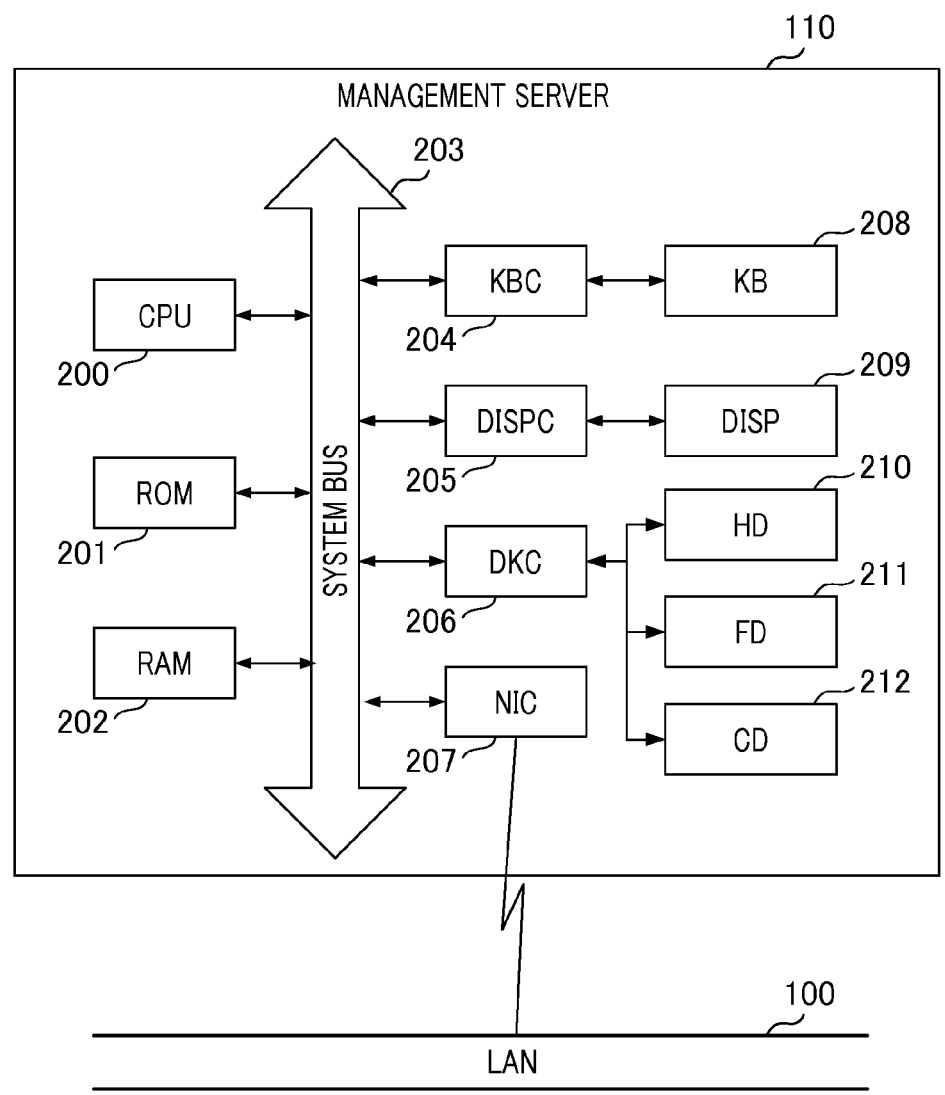
FIG. 2 illustrates an example of a hardware configuration of a management server.

The client PC 150 is assumed to be a general personal computer, and used by a security policy manager in the present embodiment. The security policy manager who uses the client PC 150 operates the management apparatus 110 by using a Web browser program so as to manage setting information and statuses of the network devices 120 to 140. In the present embodiment, assume that the client PC 150 specifically manages security information that is a portion of setting information and sorted in a security policy FIG. 2 is a diagram illustrating an example of a hardware configuration of the management server. The management apparatus 110 is a general computer. The client PC 150 has a hardware configuration similar to the management apparatus 110.

The management apparatus 110 includes a CPU 200, a ROM 201, a RAM 202, a system bus 203, a KBC 204, a DISPC 205, a DKC 206, a NIC 207, a KB 208, a DISP 209, an HD 210, an FD 211, and a CD 212. The CPU is an abbreviation for "Central Processing Unit". The CPU 200 controls overall the management apparatus 110. Specifically, the CPU 200 executes a device management program stored in the ROM (Read Only Memory) 201 or the hard disk drive (HD) 210. A description of the device management program is described below.

Further, the CPU 200 performs overall control of the respective devices connected to the system bus 203. The RAM (Random Access Memory) 202 functions as a main memory, a working area, and the like of the CPU 200.

The KBC (keyboard controller) 204 controls an instruction input from the KB (key board) 208, a pointing device (not shown), or the like. The DISPC (display controller) 205 controls display on the DISP (display) 209.

The DKC (disk controller) 206 controls accesses to the HD 210, the FD (a Floppy (Registered) disk controller) 211, and the CD (CD-ROM drive) 212.

The NIC (Network Interface Card) 207 transmits/receives data to/from the client PC 150 or the network devices 120 to 140 via a LAN (Local Area Network) 100. Note that the main object of execution on the hardware relating to the management apparatus is the CPU 200, and the main object of control on the software is the device management program stored in the hard disk 210 unless otherwise stated in all explanations described below. The device management program also may be supplied by being stored in a storage medium such as a CD-ROM, and in such a case, the device management program is read from the storage medium by the CD-ROM drive 212 or the like, and installed into the HD 210.

Figure 3:
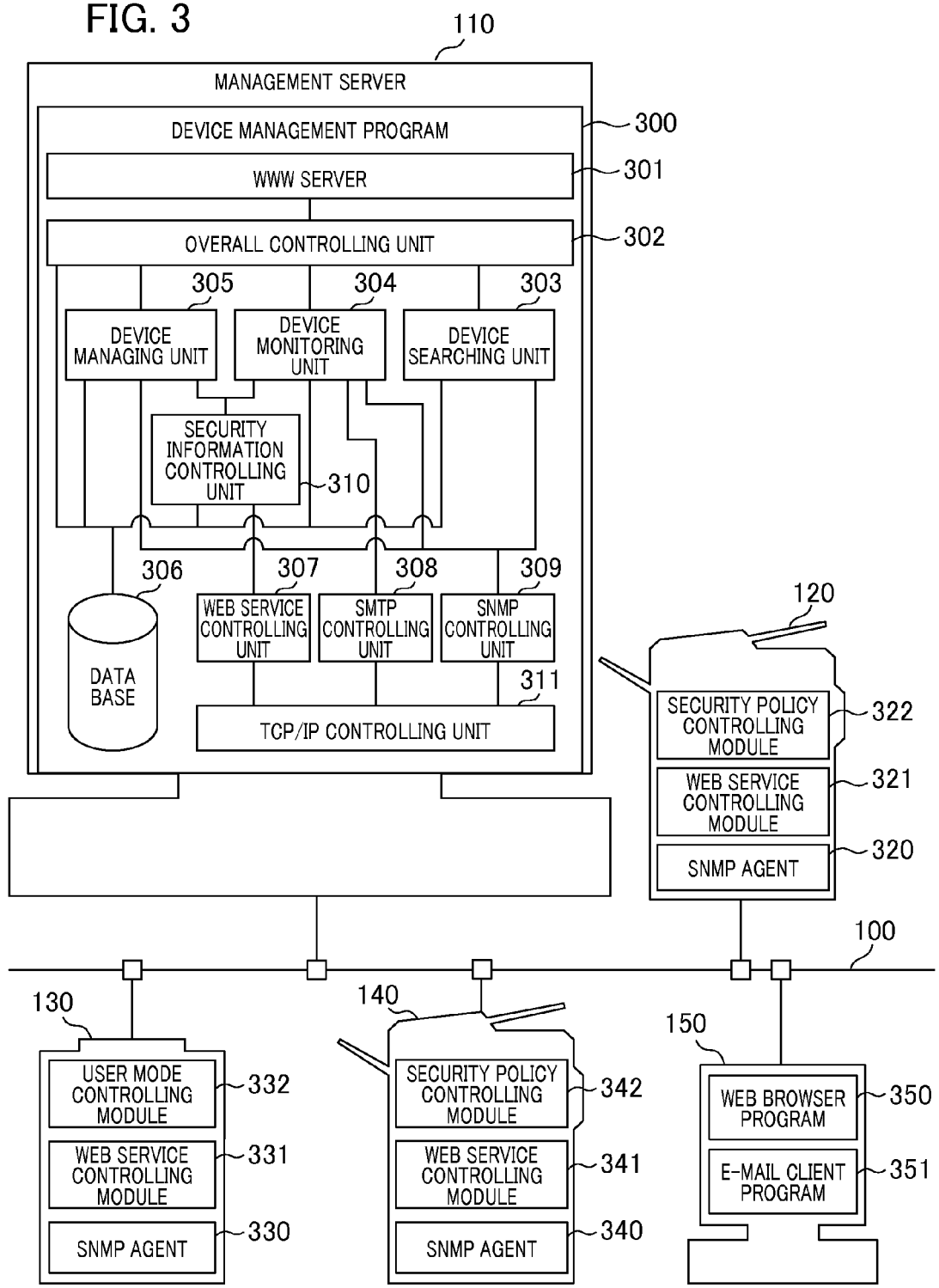
FIG. 3 illustrates an example of a software configuration of each device included in the device management system.

FIG. 3 is a diagram illustrating an example of a software configuration of each device included in the device management system. The management apparatus 110 includes a device management program 300. In the present embodiment, the device management program 300 operates on a WWW server program 301, and communicates with a Web browser program 350 on the client PC 150 by using an HTTP protocol.

Assume that the device management program 300 and the network devices 120, 130 and 140 acquire/set various parameters such as security information by using a WEB service, SNMP, and the like. Further, assume that the device management program 300 can transmit an e-mail to the client PC 150 by using the SMTP protocol. SMTP is an abbreviation for "Simple Mail Transfer Protocol". Also, the device management program 300 is stored in the hard disk (HD) 210, and unless otherwise stated, the object of execution thereof is the CPU 200.

Next, a description will be given of a processing unit inside the management apparatus 110, which is realized by the device management program 300. The WWW server 301 operates on the management apparatus 110.

The device management program 300 receives a HTML data transmission request from the WEB browser program 350 operating on the client PC 150 via the WWW server 301. The device management program 300 that has received the HTML data transmission request acquires/sets parameters for generating HTML data by using the network devices 120 to 140, a WEB service, SNMP, and the like. Further, the device management program 300 generates the HTML data based on setting values of the parameters received from the network devices 120 to 140, and transmits the generated HTML data to the WEB browser program 350 operating on the PC 150 via the WWW server 301. In the present embodiment, assume that the WWW server 301 can transmit/receive security information in an XML format to/from the network device 120 to 140.

The overall controlling unit 302 acquires/sets parameters by communicating with the network devices 120 to 140. The overall controlling unit 302 also controls a device searching unit 303, a device monitoring unit 304, and a device managing unit 305 for generating the HTML data.

The device searching unit 303 searches for the network devices 120 to 140, and registers necessary information with a database unit 306. In particular, the device searching unit 303 controls an SNMP controlling unit 309 so as to search for the network devices 120 to 140 by the way of unicast, broadcast by SNMP. As to whether the network device to be managed is compliant with the policy setting function, determination is performed in search processing by the device searching unit 303, the determination result is saved in the database unit 306.

The device monitoring unit 304 performs polling by SNMP at a constant frequency preset via the SNMP controlling unit 309, and acquires state information for the network devices 120 to 140 to thereby determine presence or absence of a failure.

Also, the device monitoring unit 304 can monitor a state of security information for the network device 120, 130, and 140 via a security information controlling unit 310. When detecting a failure of the network device or a change in security information, the device monitoring unit 304 can notify the client PC 150 of the failure or the change in security information by an e-mail via an SMTP controlling unit 308.

The device managing unit 305 transmits/receives different information such as security information to/from the searched network devices 120 to 140. Information about the result of the search performed by the device searching unit 303, information about the result of the monitor processing performed by the device monitoring unit 304, a history of information transmitted/received by the device managing unit 305 to/from the network device, and the like are stored in the database unit 306.

For example, a device name, a product name, a firmware version, an application installation status of the device which the device searching unit 303 acquires from the network device, state information acquired by device monitor processing, and the like are stored in the database unit 306. Also, failure information or a change history of security information for the network devices 120 to 140, which has been detected in the monitor processing executed by the device monitoring unit 304, is stored in the database unit 306. Further, security information, various setting information related to printing, or the like, which have been transmitted/received between the device managing unit 305 and the network devices 120 to 140, is stored in the database unit 306.

A WEB service controlling unit 307 accepts a request from the device managing unit 305, and transmits/receives security information or other settings in the XML format to/from the network devices 120 to 140.

The SMTP controlling unit 308 transmits an e-mail to the client PC 150 if the device monitoring unit 304 detects a failure of the network device, or a setting change in security information.

The SNMP controlling unit 309 accepts a request from the device searching unit 303, the device monitoring unit 304, or the device managing unit 305, and controls communication by SNMP with the network devices 120 to 140.

The security information controlling unit 310 handles XML data of security information in response to a request from the device managing unit 305 or the device monitoring unit 304. A TCP/IP controlling unit 311 controls communication by TCP/IP in response to a request from the WEB service controlling unit 307, the SMTP controlling unit 308, or the SNMP controlling unit 309.

Next, a description will be given of processing units provided in the network device. SNMP agents 320, 330 and 340 operate on the network devices 120, 130 and 140, respectively.

The SNMP agents 320, 330, and 340 refer to internal the information of a MIB (Management Information Base), and respond to a request by NSMP transmitted from the device management program 300 corresponding to an SNMP manager.

WEB service controlling modules 321, 331, and 341 handle different information such as security information in the XML format on the network devices 120, 130, and 140, respectively.

Security policy controlling modules 322 and 342 are provided in the network devices 120 and 140 having the policy setting function. The security policy controlling modules 322 and 342 receive a request from the device management program 300, and transmit/receive security information for the network devices 120 and 140, respectively.

A user mode controlling module 332 is provided in the network device 130 that is non-compliant with the policy setting function. The user mode controlling module 332 receives a request from the device management program 300, and transmits/receives different information including security information.

Next, a description will be given of processing units provided in the client PC. The WEB browser program 350 transmits a request by executing the device management program 300 that operates on the management apparatus 110, and receives HTML data generated as the result of the request.

An e-mail client program 351 receives an e-mail for notifying a policy manager about information regarding a failure or a change in security information for the network device from the management apparatus 110.

FIG. 9 is a diagram illustrating examples of various tables stored in the database unit provided in the management server. The database unit 306 includes a monitor target device managing table 901, monitor condition managing tables A and B, and a security information managing table 904. In this example, the monitor condition managing table A is described as a monitor condition managing table 902, and the monitor condition managing table B is described as a monitor condition managing table 903.

FIG. 9A illustrates the monitor target device managing table 901. Monitor target device information is stored in the monitor target device managing table 901. The monitor target device information is information regarding a device to be monitored of which different information is monitored by the device management program 300 via the device monitoring unit 304.

The monitor target device information includes, for example, a device identifier, a device name, an IP address, presence/absence of a policy setting function, a user name, a password, a registered date and time, and the like. The device identifier is information for uniquely identifying the network devices 120, 130, and 140 to be monitored. The device name is allocated to the network devices 120, 130, and 140.

The presence/absence of the policy setting function is information for determining whether the network devices 120, 130, and 140 are compliant with the policy setting function. Assume that the presence/absence of the policy setting function can be acquired when the network devices 120, 130, and 140 are retrieved on the device management program 300 via the device searching unit 303.

The user name and the password are account information of a manager used when the device management program 300 monitors security information by a procedure described below, and refers to and restores security information. An initial search date and time is information at which the device management program 300 initially searches for the network devices 120, 130, and 140 via the device searching unit 303.

FIG. 9B illustrates the monitor condition managing table 902. Also, FIG. 9C illustrates the monitor condition managing table 903. Monitor condition information is stored in the monitor condition managing table 902 and the monitor condition managing table 903. The monitor condition information is information regarding conditions when the device monitoring unit 304 on the device management program 300 monitors the network device 120, 130, and 140.

The monitor condition information stored in the monitor condition managing table 902 includes a condition identifier, a start day and time, and an execution schedule. The condition identifier is information for uniquely identifying registered monitoring conditions. The start day and time is date and time information for starting monitoring of the network devices 120, 130, and 140. The execution schedule is information indicating a date and time that defines a monitoring schedule of the network devices 120 to 140, and that can be registered for each day.

Monitor condition information stored in the monitor condition managing table 903 includes a condition identifier, security information monitoring, state information monitoring, a notice destination mail address, and a registered date and time. The security information monitoring is information for indicating whether security information for the network devices 120 to 140 is subject to monitoring. The state information monitoring is information for indicating whether state information for the network devices 120 to 140 is subject to monitoring. Assume that the state information is acquired from the respective MIBs of the network devices 120 to 140 by SNMP. The registered date and time is information for indicating a date and time at which each monitoring condition is registered.

FIG. 9D illustrates a security information managing table 904. Security comparison target information is stored in the security information managing table 904. The security comparison target information is information to be subject to comparison processing with security information acquired from the network devices 120, 130, and 140. A change in security information for the network device is determined by this comparison processing.

The security comparison target information includes a device identifier, a port open setting, a firewall required, an initial password forced change, a password complexity request, a guest account prohibition, and a final update date and time. The port open setting is information for a communication port in an open state on the network devices 120 to 140. The firewall required is information for indicating whether firewall activation is necessarily required for activation when the network communicates with an external device.

The initial password forced change is information for indicating whether a change for an initial setting of a password is necessarily required when the network devices 120 to 140 are initially used. The password complexity request is information for indicating a forced mode in which a character type, the number of characters, or the like that form a password are forced to comply with a complexity condition separately defined when the password is set. The guest account prohibition is information for prohibiting usage of the network devices 120 to 140 via a guest account. The final update date and time is information indicating a date and time at which the security information management table is updated.

FIG. 10 is a diagram illustrating examples of various tables in which information held by the network device is stored. FIG. 10A to FIG. 10C are tables held by the network devices 120 and 140 that are compliant with the policy setting function. Also, FIG. 10D and FIG. 10E are tables held by the network device 130 that are non-compliant with the policy setting function.

FIG. 10A illustrates an example of a user management table. The user management table 1001 is a table for managing user information for the network devices 120 and 140. The user information includes, for example, a policy manager, a general user 1, a general user 2, and a general user 3.

Authentication information (a user name and a password) that is required when security information is referred to and set is stored in the policy manager. Authentication information (a user name and a password) shows when the network device is used, and a user mode setting that is referred to and set is stored in the general user1, the general user2, and the general user3. Assume that the policy manager is a specific account for managing security information, and thus, only limited number of accounts can be registered compared with the general user.

FIG. 10B illustrates a security information management table. A port open setting, a firewall required, an initial password forced change, a password complexity request, a guest account prohibition, a final update date and time, and the like are stored in the security information managing table 1002. The port open setting, the initial password forced change, the password complexity request, and the guest account prohibition are the same information as that stored in security information managing table 904 shown in FIG. 9D. Information indicating a date and time at which security information for the network devices 120 and 140 is updated is stored in the final update date and time. The security information managing table 1002 can be referred to and set by only an account registered with the user management table 1001 as the policy manager.

FIG. 10C illustrates a user mode management table. General setting information in the network device is stored in the user mode setting management table 1003. Information managed in the user mode management table 1003 includes, for example, a paper feeding method, a job interruption time-out, a color automatic selection in copying, a report output by a printer, an alarm volume, a final update date and time, and the like. The paper feeding method is information for selecting an optimal method from among options such as a speed priority, a print surface priority, or the like. The job interruption time-out is information for setting a timer value by a minute unit which is required for determining a job interruption.

The color automatic selection in copying is information for setting whether a function for automatically switching color/monochrome about a copy output in accordance with color/monochrome about a manuscript read by a scanner. The printer report output is information for designating a report type output from among options such as a status print, a font list, or the like. The alarm volume is information for setting a sound volume of an alarm when a failure such as a paper jam has occurred in the network device. Information for indicating a date and time at which user mode settings of the network devices 120 and 140 are updated is stored in the user management table 1003. The user management table 1003 can be referred to and set via all user accounts registered with the user management table 1001 as the general user.

FIG. 10D illustrates a user management table. The user management table 1011 manages user information for the network device 130 that is non-compliant with the policy setting function. For example, the general user 1, the general user 2, and the general user 3 are included in this user information. This information is the same as that in the user management table 1001, but information regarding the policy manager does not registered.

FIG. 10E illustrates a user mode management table. A port open setting, a paper feeding method, a job interruption time-out, a firewall required, a color automatic selection in copying, a printer report output, a final update date and time, and the like are stored in the user mode management table 1012. Information stored in the user mode management table 1012 is the same as that stored in the security information managing table 1002 in FIG. 10B, and the user mode management table in FIG. 10C.

Although not shown in the figure, assume that information such as the initial password forced change, the password complexity request, the guest account prohibition, and the like are registered with the user mode management table 1012. Also, the user mode management table 1012 can be referred to and set via all user accounts registered with the user management table 1011 as the general user.

As discussed above, the security information and the user mode setting are managed in different tables in the multifunctional network devices 120 and 140 compliant with the policy setting function. Further, the security information managing table 1002 can be referred to and set only via the account registered with the user management table 1001 as the policy manager.

In contrast, in the case of the network device 130 that is non-compliant with the policy setting function, the security information is managed in the user mode management table 1012 along with various general information. The user mode management table 1012 also can be referred to and set via all accounts registered with the user management table 1011 as the general user. In this manner, security management for the network devices 120 and 140 compliant with the policy setting function is ensured than the network device 130 non-compliant with the policy setting function.

Figure 4:
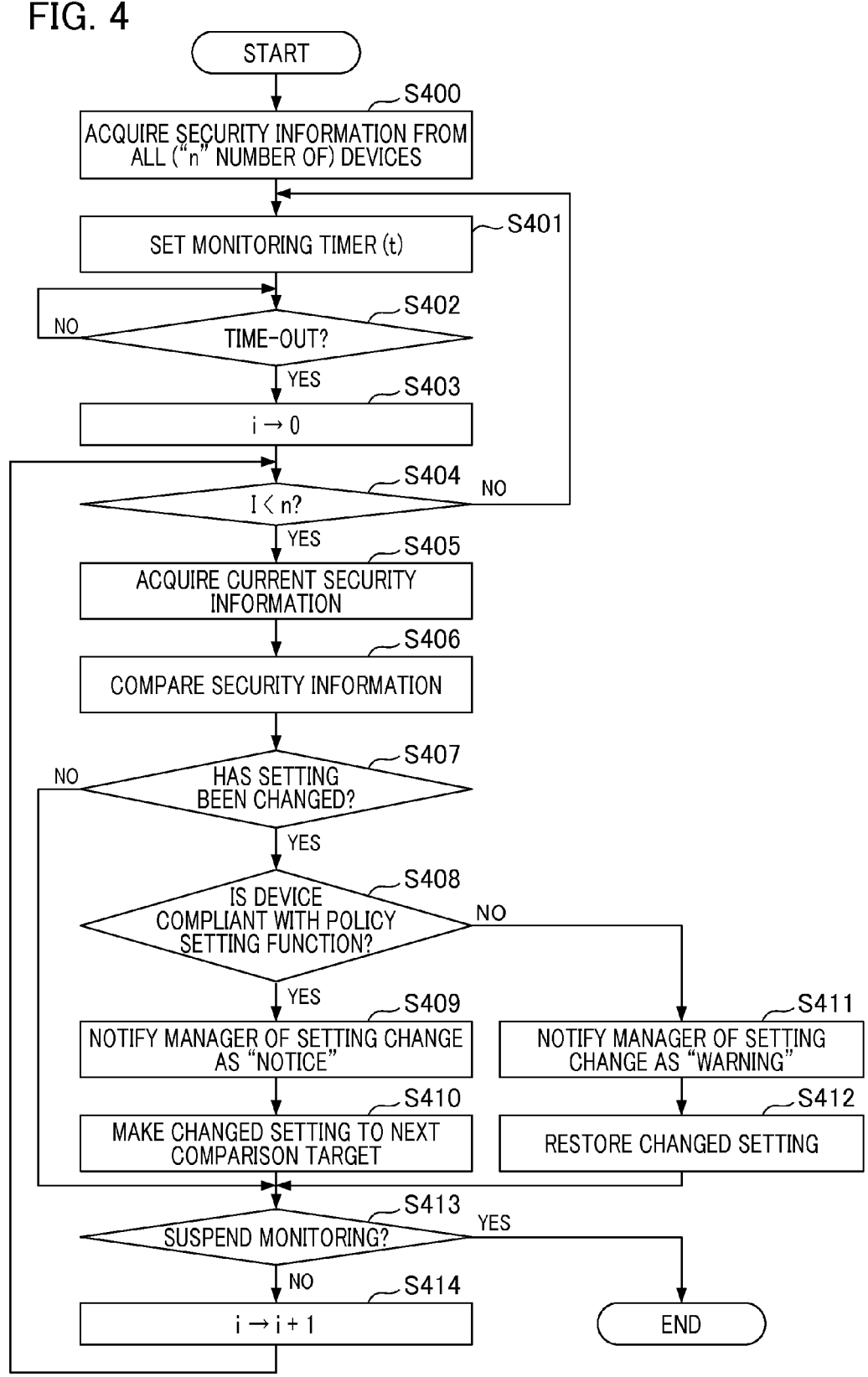
FIG. 4 is a flowchart illustrating an example of monitor processing when security information is changed.

FIG. 4 is a flowchart explaining an example of the monitor processing of a change in security information in the network device by the device management program. Assume that the device management program 300 searches for n number of devices by the device searching unit 303 via the SNMP controlling unit 309, and monitors them as a monitoring target.

Firstly, the device management program 300 acquires, from among the retrieved n number of devices, current settings of security information to be compared for determining a setting change in S400. The device management program 300 saves the acquired setting of security information in the database unit 306.

Next, the device management program 300 sets a monitoring timer for periodically monitoring security information for the network device to be monitored in S401. Subsequently, the device management program 300 determines whether the timer set in S401 has timed out in S402. When the timer has timed out, the process advances to S403. When the timer has not timed out, the process returns to S402.

In S403, the device management program 300 initializes an index "i" for counting the network device to be managed to 0. Then, the device management program 300 determines whether the index "i" is smaller than "n" that is the total number of the network devices to be managed in S404. When the index "i" is smaller than "n", the process advances to S405. When the index "i" is not smaller than "n", the process returns to S401.

In S405, the device management program 300 receives and acquires current security information from the "i"th network device. When the "i"th network device that is a transmission source of the security information corresponds to the policy setting function, the device management program 300 requests security information to the security policy controlling units 322 and 342 of the network device. On the other hand, when the "i"th network device is non-compliant with the policy setting function, the device management program 300 requests security information to the user mode controlling unit 332 of the network device.

Next, in S406, the device management program 300 compares the security information acquired in S400 with the security information acquired in S405 or security information to be acquired in S410 described below.

Next, in S407, the device management program 300 determines whether the security information has been changed based on the result of the comparison processing in S406 (first determination). When the security information has been changed, the process advances to S408. When the security information has not been changed, the process advances to S413.

In S408, the device management program 300 determines whether the "i"th network device is compliant with the security policy setting function or not with reference to the database unit 306 (second determination).

When the device management program 300 determines that the "i"th network device is compliant with the security policy setting function, the process advances to S409. When the device management program 300 determines that the "i"th network device is non-compliant with the security policy setting function, the process advances to S411.

In S409, the device management program 300 notifies a policy manager of the change in the security information as "notice" by an e-mail. Then, the device management program 300 saves the changed security information in the database unit 306 in order to make it a comparison target in next monitor processing in S410.

Next, the device management program 300 determines whether monitoring of the security policy is suspended by an operation by the policy manager in S413. When the monitoring of the security policy is suspended, the process ends. When the monitoring of the security policy is not suspended, the process advances to S414.

In S414, the device management program 300 increments index "i" for counting the network devices, and the process returns to S404.

In S411, the device management program 300 notifies the policy manager of the change in the security information as a "warning" by an e-mail. Then, in S412, the device management program 300 updates the security information for the "i"th network device to the security information before the change which has been saved in the database unit 306 in S400. Then, the process advances to S413.

In this embodiment, "notice" and "warning", which are types of the e-mail sent to the policy manager respectively, have the following meanings. "Notice" is a type to be applied when an event that does not indicate an obstacle in managing the network device by the device management program is detected. In contrast, "warning" is a type to be applied when an event that literally indicates obstacle on a security in managing the network device is detected.

That is, in the case of the network device compliant with the policy setting function in the present embodiment, the policy manager account that is a dedicated management account is required for the authentication processing in order to change security information. In the case of the network device that is non-compliant with the policy setting function, security information can be changed via the general user account. Thus, when security information for the network device compliant with the policy setting function is changed, it can be understood that the policy manager has purposely changed the security information.

In contrast, when security information for the network device that is non-compliant with the policy setting function is changed, it may be a setting change not intended by the policy manager. Thus, the change in the security information is notified as a "notice" in S409 and S410, whereas the change in the security information is notified as a "warning" in S411 and S412, and the changed security information is restored to a state before the change.

Figure 5:
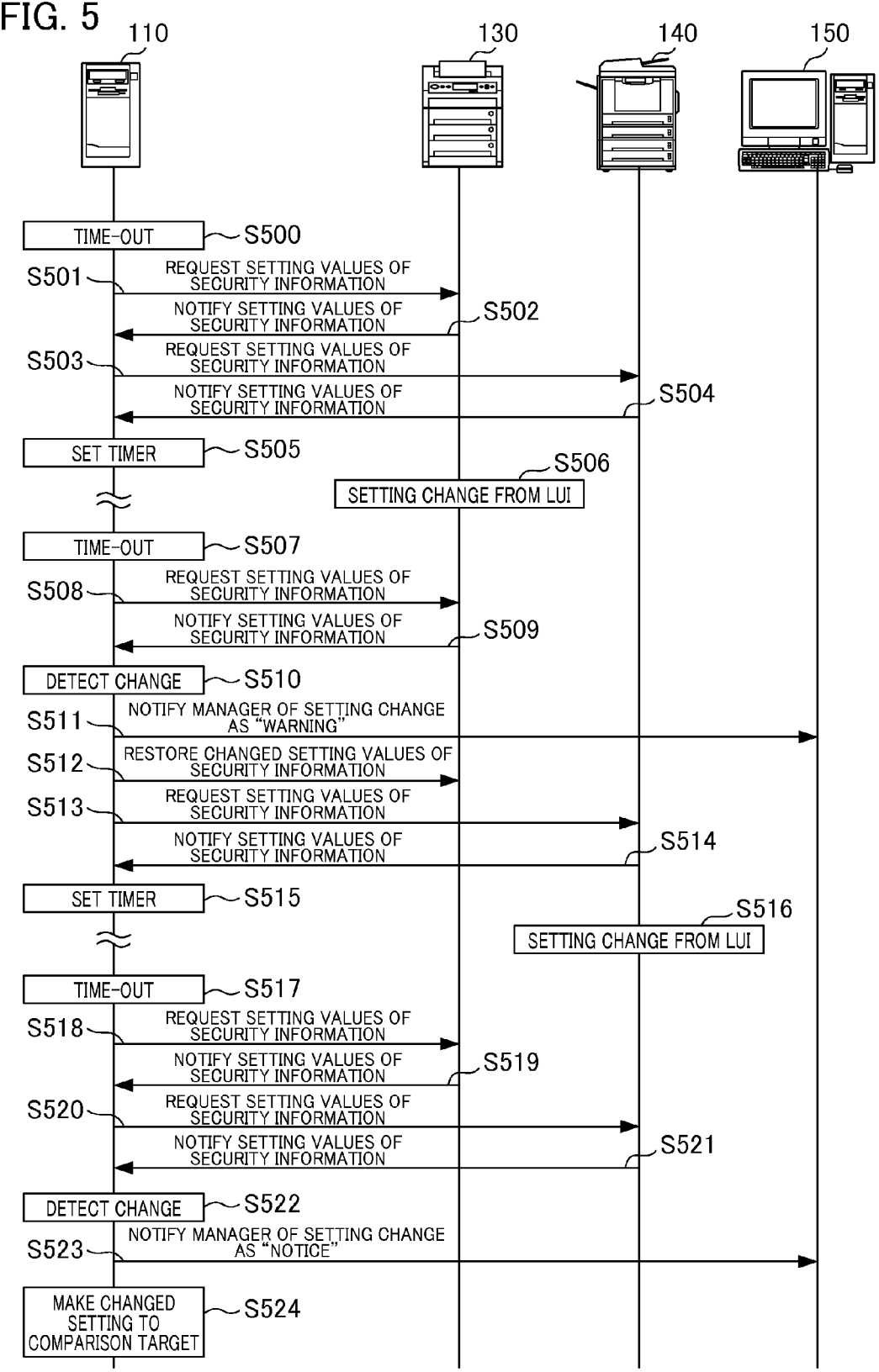
FIG. 5 is a sequence diagram illustrating a monitor action for security information.

FIG. 5 is a sequence diagram illustrating monitoring operations for security information by the device management program. As shown in FIG. 5, assume that the device management program 300 monitors security information under a network environment in which the network device 140 compliant with the policy setting function and the network device 130 that is non-compliant with the policy setting function are mixed.

Firstly, a time-out of the monitoring timer for periodically monitoring the security information set in S401 in FIG. 4 has occurred in S500. Next, the device management program 300 requests for security information to the network device 130 in S501. Then, the security information is notified by the network device 130 that has responded to the request to the device management program 300 in S502.

Next, the device management program 300 requests for security information to the network device 140 in S503. In S504, the security information is notified by the network device 140 that has responded to the request to the device management program 300.

Next, the device management program 300 sets a monitoring timer for periodically monitoring security information in S505. The process in S505 corresponds to the process in S401 in FIG. 4.

In S506, security information is changed through a local panel of the network device 130 by an arbitrary user. Assume that in the case of the network device 130 that is non-compliant with the policy setting function, the security information is dealt with as a part of the parameters of a user mode, and the setting change is permitted through the authentication processing using account information allocated to a general user.

Next, in S507, a time-out of the monitoring timer set in S505 has occurred. In S508, the device management program 300 requests security information to the network device 130. Then, the security information is notified by the network device 130 to the device management program 300 in S509.

Next, in S510, the device management program 300 detects the change in the security information in S506. The detecting processing of the change in the security information is the same as that in S407 in FIG. 4.

Next, the device management program 300 notifies the client PC 150 operated by the policy manager that the security information has been changed in S511. Since the network device 130 is non-compliant with the policy setting function, there is a possibility that the security information has been changed by a user other than the policy manager. Thus, the device management program 300 notifies the policy manager about the change in the security information as a "warning".

Next, the device management program 300 reconfigures the security information for the network device 130 to the security information before the change in S512. Also, the device management program 300 requests security information to the network device 140 in S513. Then, the security information is notified from the network device 140 to the device management program 300 in S514.

Next, the device management program 300 sets the monitoring timer for periodically monitoring security information in S515. In 516, security information is changed through a local panel of the network device 140 by an arbitrary user. Assume that in the case of the network device 140 compliant with the policy setting function, security information is dealt with as the security policy, a setting change is permitted through the authentication processing using account information allocated to the policy manager.

Next, a time-out of the monitoring timer set in S515 has occurred in 517. Subsequently, the device management program 300 requests security information to the network device 130 in S518. Then, the security information is notified from the network device 130 to the device management program 300 in S519.

Also, the device management program 300 requests security information to the network device 140 in S520. Then, the security information is notified from the network device 140 to the device management program 300 in S521.

Next, in S522, the device management program 300 detects the change in the security information performed in S516. Then, the device management program 300 notifies the client PC 150 that the security information has been changed in S523. Note that since the network device 140 is compliant with the policy setting function, the network device 140 can interpret that the security information has been changed by the policy manager. Thus, the device management program 300 notifies the policy manager of the change in the security information as a "notice".

In S524, the device management program 300 saves the changed security information in the database unit 306 for making it a new comparison target in the monitor processing.

As described above, upon detecting the change in the security information for the network device, the device management program 300 operates to accept the change in the network device 140 compliant with the policy setting function. While, upon detecting the change in the security information for the network device 130, the device management program 300 operates to restore the security information to the state before the change as well as warning the manager. In this manner, the change in the security information can be rejected with respect to the network device 130 that is non-compliant with the policy setting function for which a general user can change the security information.

In contrast, the change in the security information can be permitted with respect to the network device 140 compliant with the policy setting function for which a specific manager can change the security information. In this manner, the present invention can provide a technique by which the server effectively manages the security policy of the network device under an environment where the network device having the policy setting function and the network device not having the policy setting function are mixed.

Second Embodiment

In the first embodiment above, the device management program 300 changes control of the monitor processing of the security information according to a condition as to whether the network device to be managed is compliant with the policy setting function or not. In a second embodiment, the device management program 300 further changes control of the monitor processing of the security information according to a change level when the security information for the network device to be managed is changed. Specifically, the device management program 300 determines a level of the setting values after security information is changed, and the device management program 300 notifies the manager of the setting change when it is determined that the level of the setting values after the security information is changed is below a prescribed level, that is, a setting value is changed to a lower level.

The system configuration, hardware configuration, software configuration, and data table configuration of the device management system in the second embodiment are the same as those in the first embodiment, and thus, a description thereof is omitted.

Figure 6:
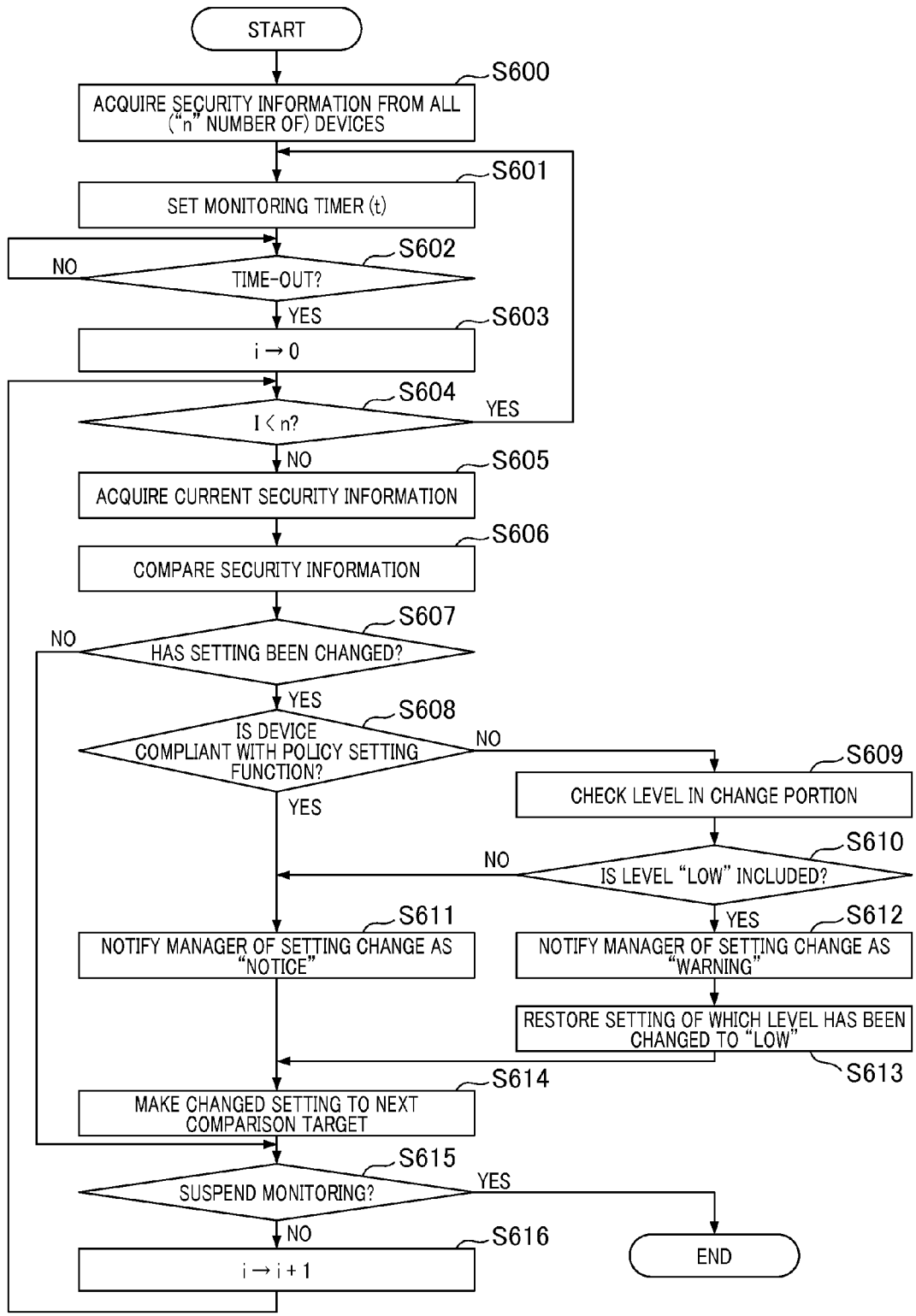
FIG. 6 is a flowchart illustrating an example of monitor processing when security information is changed.

FIG. 6 is a flowchart illustrating an example of monitor processing of a change in security information by the device management program in the second embodiment. The processes in S600 to S608 in FIG. 6 are the same as those in S400 to S408 in FIG. 4. Also, the processes in S611, S614, S615, and S616 in FIG. 6 are the same as those in S409, S410, S413, and S414 in FIG. 4.

In the second embodiment, when the security information of the "i"th network device has been changed, and the "i"th network device is non-compliant with the policy setting function, the process advances to S609. Then, in S609, the device management program 300 refers to a security level determination table so as to check a level of a changed portion of the security information, and the process advances to S610.

A determination condition for determining the level of the security information is preset in the security level determination table. The determination condition is set, for example, in accordance with an operation on a security level determination condition setting screen.

In the second embodiment, assume that a setting value change such that a security vulnerability is increased is treated as a "low" level, whereas a setting value change such that a security vulnerability is decreased is treated as a "high" level. Hence, for example, when a state of a communication port is changed from an open state to a close state, the device management program 300 determines the level to be the "high" level. Also, for example, when encryption of a communication pathway is changed from "valid" to "invalid", the device management program 300 determines the level to be the "low" level.

FIG. 11 is a diagram illustrating examples of the security level determination table and the security level determination condition setting screen. FIG. 11A illustrates the security level determination table. The security level determination table includes, for example, a port open setting, a firewall required, an initial password forced change, a password complexity request, a guest account prohibition, and the like. In the example shown in FIG. 11A, the condition in which it is determined to be "low" level when the setting change in the network device is detected is set in the respective items of the port open setting, the firewall required, the initial password forced change, the password complexity request, and the guest account prohibition. Note that the determination condition set in the security level determination table may be subject to hard coding in the device management program 300, or may be set on the security level determination condition setting screen 1102.

FIG. 11B illustrates the security level determination condition setting screen. The security level determination condition setting screen is an operation screen for manually setting the determination condition in the security level determination table. In the example shown in FIG. 11B, a user can select the determination condition for the level for the port open setting from among "open port addition timing", "open port addition and deletion timing", or "out of a security level determination target".

The "open port addition timing" is a setting in which the change level of the security information is determined to be "low" when a communication port is newly opened. The "open port addition and deletion timing" is a setting in which the change level of the security information is determined to be "low" when the communication port is newly opened or the already opened communication port is closed. The "out of the security level determination target" is a setting in which the change level of the security information is determined to be "high" even when the communication port is newly opened or the opened communication port is closed.

Returning to the description in FIG. 6, in S610, the device management program 300 determines whether the level check results of the security information in S609 includes the change that the level shifts to the level "low". When the device management program 300 determines that the level check results of the security information does not include the change that the level shifts to the level "low", the process advances to S611. Then, the device management program 300 notifies the policy manager that the security information has been changed as "notice" by an e-mail in S611.

When the device management program 300 determines that the level check results of the security information includes the change that the level shifts to the level "low", the process advances to S612. The device management program 300 notifies the policy manager that the security information has been changed to "warning" by an e-mail, and the process advances to S613.

Next, in S613, the device management program 300 restores only the setting that has been changed to the level "low" among the changes in the security information performed in the "i"th network device to the security information before the change. Then, the process advances to S614.

As described above, the device management program 300 in the second embodiment operates to accept the change in which the level shifts to the level "high" upon detecting the security information for the network device. In contrast, when the changed security information includes the change in which the level shifts to the level "low", the device management program 300 operates to restore only the setting of which the level has been changed to the level "low" to the state before the change as well as a warning the manager. In this manner, modification in the case where security vulnerability is decreased is enabled, which ensures a high level network security.

Third Embodiment

The device management program in a third embodiment permits a change in the security information to be performed within a prescribed change permitted time zone that is registered in advance, or a change in the security information by a specific user account permitted in advance. The aforementioned predetermined change permitted time zone is hereinafter described as a "setting change permitted change time zone". The setting change permitted change time zone is a time zone in which the change in the security information is permitted. The aforementioned specific user account is hereinafter described as a "permitted account". The permitted account is a specific account by which the change in the security information is permitted even if the network device is non-compliant with the policy management function.

A hardware configuration, a software configuration, and a data table configuration in a device management system in the third embodiment are the same as those in the first embodiment, and thus, a description thereof is omitted.

Figure 7:
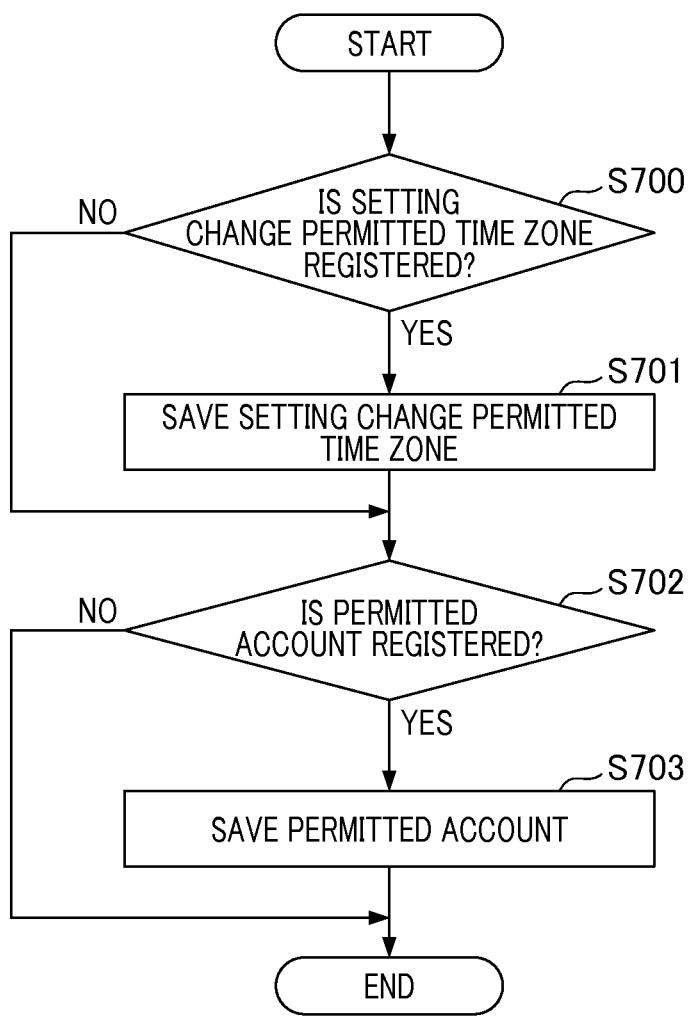
FIG. 7 is a diagram illustrating an example of registration processing of a setting change permitted time zone and a permitted account.

FIG. 7 is a flowchart illustrating an example of registration processing of the setting change permitted time zone and the permitted account. Firstly, in S700, the device management program 300 determines whether the setting change permitted time zone is registered. When the setting change permitted time zone is not registered, the process advances to S702. When the setting change permitted time zone is registered, the process advances to S701.

In S701, the device management program 300 saves the registered security information change permitted time zone in the database unit 306. Then, the process advances to S702.

In S702, the device management program 300 determines whether the permitted account is registered. When the permitted account is not registered, the process ends. When the permitted account is registered, the process advances to S703. Then, the device management program 300 saves the registered account information in the database unit 306 in S703, and the process ends.

Figure 8:
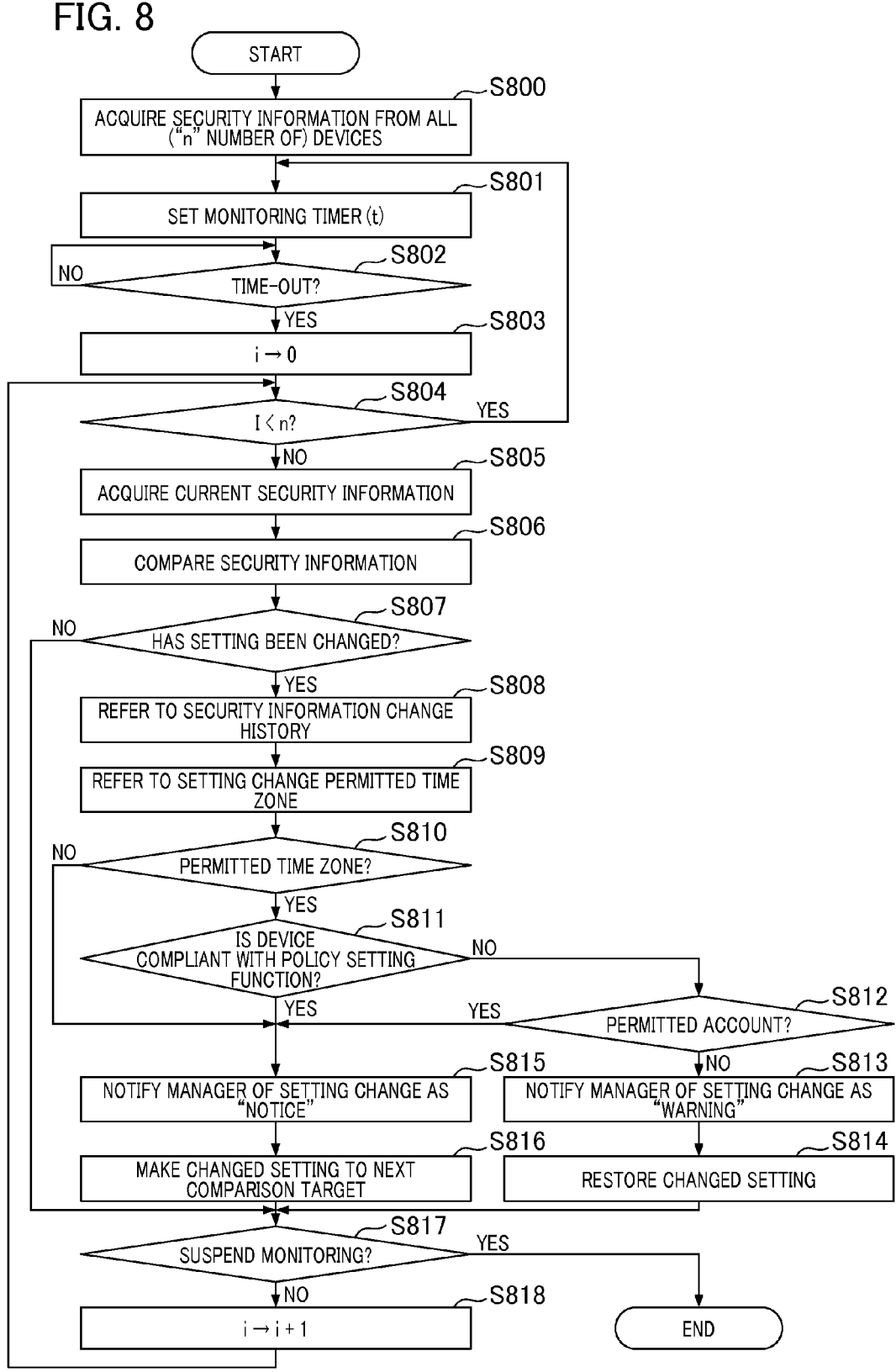
FIG. 8 is a flowchart illustrating an example of monitor processing when security information is changed.

FIG. 8 is a flowchart illustrating an example of monitor processing of a change in the security information by the device management program in the third embodiment. The processes in S800 to S807 in FIG. 8 are the same as those in S400 to S407 in FIG. 4. Also, the processes in S811 and S812 in FIG. 8 are the same as those in S408 to S414 in FIG. 4.

In the third embodiment, the device management program 300 refers to a change history of the security information stored in the database unit 306 in S808. The change history of the security information includes, for example, a change content of the security information, a change time, and user account information by which the security information is changed.

Next, the device management program 300 refers to the setting change permitted time stored in the database unit 306 in S809. In the example, assume that the setting change permitted time zone is saved in S701 in FIG. 7.

Next, in S810, the device management program 300 compares the change time recorded in the change history of the security information referred to in S808 with the setting change permitted time referred to in S809. Then, the device management program 300 determines whether the security information has been changed within the setting change permitted time zone.

When the security information has not been changed within the setting change permitted time zone, the process advances to S815. When the security information has been changed within the setting change permitted time zone, the process advances to S811.

In S811, the device management program 300 determines whether the "i"th network device is compliant with the security policy setting function. When the "i"th network device is compliant with the security policy setting function, the process advances to S815. When the "i"th network device is non-compliant with the security policy setting function, the process advances to S812.

In S812, the device management program 300 determines whether the user account indicated by the user account information in the security information change history is the permitted account. When the user account indicated by the user account information in the security information change history is a permitted account, the process advances to S815. Then, in S815, the device management program 300 notifies the policy manager of the change in the security information as a "notice" by an e-mail.

When the user account indicated by the user account information in the security information change history is not the permitted account, the process advances to S813. Then, in S813, the device management program 300 notifies the policy manager of the change in the security information as a "warning" by an e-mail.

As described above, the device management program 300 in the third embodiment determines whether the change is permitted in accordance with the change result indicating whether or not the security information has been changed within the setting change permitted time zone. In this manner, only the change in the security information within the predetermined time zone is enabled.

Also, the device management program 300 in the third embodiment determines whether the change is permitted in accordance with the change result indicating whether the change in the security information has been changed by a permitted account or not. In this manner, the setting of the security information can be changed even if the network device is non-compliant with the policy setting function while ensuring a security.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-143872, filed Jul. 9, 2013 which is hereby incorporated by reference herein in its entirety.

What is claimed is:

1. A management apparatus that manages a plurality of image forming apparatuses including a first image forming apparatus compliant with a setting management function that enables, by a specific authority, an operation of a plurality of setting values that are sorted into a prescribed policy and included in setting information for the image forming apparatus, and a second image forming apparatus, different from the first image forming apparatus, non-compliant with the setting management function, comprising:

a memory storing instructions; and
a processor which can execute the instructions causing the management apparatus to:
receive setting information from one of the plurality of image forming apparatuses;
determine whether the plurality of setting values that are sorted into the prescribed policy and included in the received setting information includes a change;
determine whether or not the image forming apparatus that is a transmission source of the setting values of which it is determined that the setting values include the change is the first image forming apparatus compliant with the setting management function;
output information indicating that the setting values have been changed as a warning if it is determined that the image forming apparatus that is the transmission source is not the first image forming apparatus and if the image forming apparatus that is the transmission source is identified as the second image forming apparatus, wherein one of the setting values of the image forming apparatus that is the transmission source and is identified as the second image forming apparatus, which is sorted into the prescribed policy, has been changed without the specific authority; and
output information indicating that the setting values have been changed as a notice as distinguished from the warning if it is determined that the image forming apparatus that is the transmission source is the first image forming apparatus, and
wherein the change, in the case where it is determined that the image forming apparatus that is the transmission source is the first image forming apparatus, is a change of the setting values according to the specific authority.

2. The management apparatus according to claim 1, wherein the instructions further cause the management apparatus to:

determine, if the image forming apparatus that is the transmission source of the setting values including the change is not the first image forming apparatus, a level of the setting values after security information has been changed; and
output information as the warning if it is determined that the level of the setting values after the security information is changed is below a prescribed level.

3. The management apparatus according to claim 2, wherein the instructions further cause the management apparatus to:

determine, if the image forming apparatus that is the transmission source of the setting values including the change is not the first image forming apparatus, whether the changed setting values has occurred due to a permitted specific user account; and output information as the warning if it is determined that the changed setting values have not occurred due to the permitted specific user account.

4. The management apparatus according to claim 1, wherein the instructions further cause the management apparatus to:

determine, if it is determined that the setting values include the change, whether the setting values have been changed within a prescribed time zone; and determine whether or not the image forming apparatus that is the transmission source of the setting values is the first image forming apparatus if it is determined that the setting values have been changed within the prescribed time zone.

5. The management apparatus according to claim 1, wherein the instructions further cause the management apparatus to restore the setting values of the image forming apparatus to setting values before the change if the information as the warning has been output.

6. The management apparatus according to claim 1, wherein the plurality of setting values sorted into the prescribed policy, includes at least one of a network-related setting, a user authentication/password setting, a job-related setting, and a secret code/encryption key-related setting.

7. The management apparatus according to claim 1, wherein the prescribed policy is a security policy.

8. A control method of a management apparatus that manages a plurality of image forming apparatuses including a first image forming apparatus compliant with a setting management function that enables, by a specific authority, an operation of a plurality of setting values that are sorted into a prescribed policy and included in setting information for the image forming apparatus, and a second image forming apparatus, different from the first image forming apparatus, non-compliant with the setting management function, comprising:

receiving setting information from one of the plurality of image forming apparatuses;

determining whether the plurality of setting values that are sorted into the prescribed policy and included in the received setting information includes a change;

determining whether or not the image forming apparatus that is a transmission source of the setting values of which it is determined that the setting values include the change is the first image forming apparatus compliant with the setting management function;

outputting information indicating that the setting values have been changed as a warning if it is determined that the image forming apparatus that is the transmission source is not the first image forming apparatus and if the image forming apparatus that is the transmission source is identified as the second image forming apparatus, wherein one of the setting values of the image forming apparatus that is the transmission source and is identified as the second image forming apparatus, which is sorted into the prescribed policy, has been changed without the specific authority; and outputting information indicating that the setting values have been changed is output as a notice as distinguished from the warning if it is determined that the image forming apparatus that is the transmission source is the first image forming apparatus, wherein the change, in the case where it is determined that the image forming apparatus that is the transmission source is the first image forming apparatus, is a change of the setting values according to the specific authority.

9. A non-transitory storage medium on which is stored a computer program for making a computer execute a control method of a management apparatus that manages a plurality of image forming apparatuses including a first image forming apparatus compliant with a setting management function that enables, by a specific authority, an operation of a plurality of setting values that are sorted into a prescribed policy and included in setting information for the image forming apparatus, and a second image forming apparatus, different from the first image forming apparatus, non-compliant with the setting management function, comprising:

receiving setting information from one of the plurality of image forming apparatuses;

determining whether the plurality of setting values that are sorted into the prescribed policy and included in the received setting information includes a change;

determining whether or not the image forming apparatus that is a transmission source of the setting values of which it is determined that the setting values include the change is the first image forming apparatus compliant with the setting management function;

outputting information indicating that the setting values have been changed as a warning if it is determined that the image forming apparatus that is the transmission source is not the first image forming apparatus and if the image forming apparatus that is the transmission source is identified as the second image forming apparatus, wherein one of the setting values of the image forming apparatus that is the transmission source and is identified as the second image forming apparatus, which is sorted into the prescribed policy, has been changed without the specific authority; and outputting information indicating that the setting values have been changed is output as a notice as distinguished from the warning if it is determined that the image forming apparatus that is the transmission source is the first image forming apparatus, wherein the change, in the case where it is that the image forming apparatus that is the transmission source is the first image forming apparatus, is a change of the setting values according to the specific authority.

* * * * *